United States Patent [19]

Krause

[11] Patent Number: 5,248,490
[45] Date of Patent: Sep. 28, 1993

[54] PROCESS FOR THE PREPARATION OF SILICON NITRIDE HAVING A SMALL CRYSTALLITE SIZE

[75] Inventor: Werner Krause, Hürth, Fed. Rep. of Germany

[73] Assignee: Hoechst Aktiengesellschaft, Frankfurt am Main, Fed. Rep. of Germany

[21] Appl. No.: 868,036

[22] Filed: Apr. 13, 1992

[30] Foreign Application Priority Data

Apr. 27, 1991 [DE] Fed. Rep. of Germany ....... 4113884

[51] Int. Cl.$^5$ ........................................... C01B 21/068
[52] U.S. Cl. .................................... 423/344; 423/406; 501/97
[58] Field of Search .................. 423/344, 406; 501/97

[56] References Cited

U.S. PATENT DOCUMENTS

| | | | |
|---|---|---|---|
| 3,959,446 | 5/1976 | Mazdiyashi et al. | 423/344 |
| 4,145,224 | 3/1979 | Mehalchick et al. | 106/73.3 |
| 4,399,115 | 8/1983 | Sato et al. | 428/344 |
| 4,492,765 | 1/1985 | Buljan | 501/97 |
| 4,686,095 | 8/1987 | Beckwith et al. | 423/324 |
| 4,859,443 | 8/1989 | Marosi | 423/344 |
| 4,983,371 | 1/1991 | Pitzer et al. | 423/344 |
| 5,030,434 | 7/1991 | Pitzer et al. | 423/344 |

FOREIGN PATENT DOCUMENTS

| | | |
|---|---|---|
| 0070440 | 2/1982 | European Pat. Off. . |
| 4037449.1 | 11/1990 | Fed. Rep. of Germany . |
| 54-124898 | 9/1979 | Japan .................. 423/344 |
| 61-063506 | 4/1986 | Japan .................. 423/344 |
| 62-162610 | 7/1987 | Japan .................. 423/344 |
| 1-100005 | 4/1989 | Japan . |

OTHER PUBLICATIONS

Mazdiyasni et al., Journal of the American Ceramic Society, vol. 56, No. 12, Dec. 1973.

*Primary Examiner*—Olik Chaudhuri
*Assistant Examiner*—Ken Horton
*Attorney, Agent, or Firm*—Connolly and Hutz

[57] ABSTRACT

To prepare silicon nitride having a crystallite size of 40 to 60 nm and a specific surface area according to BET of 21 to 40 m$^2$/g, amorphous silicon nitride or amorphous silicon nitridoimide is brought into surface contact with gas containing water vapor or water-containing solvents and the amorphous silicon nitride or amorphous silicon nitridoimide thus surface-contacted is heated under a nitrogen atmosphere at a heating rate of at least 1° C./minute to above the crystallization temperature of α-silicon nitride, which is above 1100° C.

6 Claims, No Drawings

PROCESS FOR THE PREPARATION OF SILICON NITRIDE HAVING A SMALL CRYSTALLITE SIZE

FIELD OF THE INVENTION

The present invention relates to a process for the preparation of silicon nitride having a small crystallite size.

BACKGROUND OF THE INVENTION

Silicon nitride can be prepared by various processes:
a) direct nitridation of silicon powder $$3\ Si + 2\ N_2 \rightarrow Si_3N_4$$

b) carbothermal reduction $$3\ SiO_2 + 6\ C + 2\ N_2 \rightarrow Si_3N_4 + 6\ CO$$

c) precipitation of silicon diimide and decomposition $$SiCl_4 + 6\ NH_3 \rightarrow Si(NH)_2 + 4\ NH_4Cl\ 3$$
$$Si(NH)_2 \rightarrow Si_3N_4 + 2\ NH_3$$

d) gas phase reaction $$3\ SiCl_4 + 4\ NH_3 \rightarrow Si_3N_4 + 4\ HCl$$

These processes produce crystalline silicon nitride whose particle fineness, expressed by the specific surface area (BET), is usually in the range between 1 and 15 m²/g and has a crystallite size of about 70 to 90 nm, determined from X-ray diffraction photographs.

SUMMARY OF THE INVENTION

The object was therefore to describe a process by which a silicon nitride having a crystallite size of 40 to 60 nm and a specific surface area according to BET of 21 to 40 m²/g can be prepared and which contains at most traces of amorphous silicon nitride of less than 2%.

Surprisingly, this object is achieved by bringing amorphous silicon nitride and/or amorphous silicon nitridoimide into surface contact with
a) gas containing water vapor or
b) water-containing solvents
and heating the surface-contacted amorphous silicon nitride and/or silicon nitridoimide under a nitrogen atmosphere at a heating rate of at least 1° C./minute to above the crystallization temperature of α-silicon nitride, which is above 1100° C.

DESCRIPTION OF THE PREFERRED EMBODIMENT

Further alternative embodiments of the process according to the invention can also be such that
a) an amorphous silicon nitride obtained by reaction of SiCl$_4$ and NH$_3$, followed by heating to about 1000° C. (described in more detail in Patent Application DE-P-4,037,449.1), is used;
b) the amorphous silicon nitride used is a partially hydrolyzed silicon nitride obtained by reaction of SiCl$_4$ with moist NH$_3$, followed by heating to about 1000° C. (the reaction with anhydrous ammonia instead of moist ammonia is described in Patent Application DE-P-4,037,449.1);
c) the amorphous silicon nitride is contacted with gas containing water vapor for 0.5 to 30 hours, in particular 1 to 8 hours;
d) the water-containing solvent used is i-propanol containing 0.1 to 10% by volume of water;
e) the gas containing water vapor used is untreated air.

The maximum heating rate is determined by the energy take-up of the crucible furnace. Increases in temperature of 20° C./minute or more are possible in the procedure according to the invention.

In order to ensure that all the silicon nitride is present in crystalline form, a certain heat-treating time of about 10 to 100 minutes is recommended.

The specific surface area is determined by means of nitrogen, using the Brunauer, Emett and Teller method (determination of the surface area according to BET), see Zeitschrift Analytische Chemie, Volume 238 (1968), pages 187 to 193.

The specific surface area is a measure of the particle size if the product is completely crystallized and has no amorphous portions or microporosity. Amorphous portions or microporosity drastically increase the value of the specific surface area and then no statement regarding the particle size can be made.

Values of the crystallite size of silicon nitride are determined from X-ray diffraction photographs. Owing to the small crystallite sizes, very distinct broadening of the reflections are found in the case of silicon nitride. The crystallite size is determined by measuring the half-intensity width of the reflection (201) according to the formula, see H. Krischner "Einführung in die Röntgenstrukturanalyse" (Introduction to X-ray Structure Analysis), 3rd edition, Vieweg-Verlag (1987):

$$D = \frac{\gamma \cdot 57.3}{\cos\theta \cdot \beta^{\frac{1}{2}}}$$

D: crystallite size in nm
γ: wavelength CuK α (0.15406 nm)
θ: Diffraction angle (in degrees θ for the reflection (201) = 15.50°
$\beta^{\frac{1}{2}}$: width of the reflection at half the maximum intensity (in degrees θ)

It was found that the crystalline size in silicon nitride can be controlled by the amount of water applied to the silicon nitride. Up to an oxygen content of about 4% by weight in the final product, the crystallite size diminishes. Above about 4% by weight, the final products contain increasing, unwanted portions of amorphous silicon nitride. The amount of water applied can easily be determined by the increase in weight. An increase in weight, due to the water applied, of 1% by weight corresponds to an additional amount of oxygen of 0.8–1% by weight in the final product.

The final product obtained additionally contains up to 10% of β-silicon nitride, the balance being α-silicon nitride, and is suitable in this form in particular as seed material in the preparation of finely divided silicon nitride, which in turn is used for the preparation of sintered silicon nitride.

An amorphous silicon nitride which is preferably used in the preparation process according to the invention can be obtained, for example, according to Example 1 of DE-P 4,037,449.1:

In a vertical reaction container, a silicon tetrachloride/nitrogen gas mixture obtained by passing 200 l/h of nitrogen through silicon tetrachloride maintained at about 25° C. is introduced into its lower portion. 450 l/h of dry ammonia gas flow into the upper portion of the reaction container. At the bottom of the reaction container, 0.8 kg/h of silicon tetrachloride/ammonia reaction product is removed.

After heating the silicon tetrachloride/ammonia reaction product in a heating furnace to 1000° C. in an ammonia atmosphere, amorphous silicon nitride having particle sizes of 5 to 10 μm and containing <0.5% by weight of chlorine and <0.06% by weight of carbon and having a specific surface area (BET) of 360 m²/g is obtained.

The invention is illustrated in more detail by means of the examples which follow.

Preparation of Silicon Nitride

Example 1 from DE-P 4,037,449.1, described above in the application text, was repeated.

The amorphous silicon nitride had the following quality features:

| 1) Specific surface area (BET): | 340 m²/g |
|---|---|
| 2) Chlorine content: | 0.30% by weight |
| 3) Carbon content: | <0.06% by weight |

COMPARATIVE EXAMPLE 1 (prior art)

25 g of the amorphous silicon nitride prepared were heated in an $Si_3N_4$ crucible in a crucible nitrogen atmosphere with exclusion of air and moisture at a heating rate of 10° C./minute to 1480° C. and heat-treated at this temperature for 1 hour.

The completely crystalline silicon nitride removed after cooling had a specific surface area (BET) of 10 m²/g and an oxygen content of 0.8% by weight. X-ray phase analysis gave 84% of $\alpha$-$Si_3N_4$ and 16% of $\beta$-$Si_3N_4$. A crystallite size of 65 nm was determined from broadening of the reflection.

EXAMPLE 1 (according to the invention)

25 g of the amorphous silicon nitride prepared were allowed to stand in an $Si_3N_4$ crucible in air for 1 hour. For better contact with the air, the powder was thoroughly mixed 5 times using a spoon. The silicon nitride was then heated in a crucible furnace under a nitrogen atmosphere at a heating rate of 10° C./minute to 1480° C. and heat-treated at this temperature for 1 hour. The completely crystalline silicon nitride removed after cooling had a specific surface area (BET) of 21 m²/g and an oxygen content of 1.3% by weight. X-ray phase analysis gave 90% of $\alpha$-$Si_3N_4$ and 10% of $\beta$-$Si_3N_4$. A crystallite size of 57 nm was determined from broadening of the reflection.

EXAMPLE 2 (according to the invention)

The procedure of Example 1 was repeated, except that the residence time in air was increased to 2 hours. The completely crystallized silicon nitride had a specific surface area (BET) of 23 m²/g and an oxygen content of 1.6% by weight. X-ray phase analysis gave 91% of $\alpha$-$Si_3N_4$ and 9% of $\beta$-$Si_3N_4$. A crystallite size of 56 nm was determined from broadening of the reflection.

EXAMPLE 3 (according to the invention)

The procedure of Example 1 was repeated, except that the residence time in air was increased to 4 hours. The completely crystallized silicon nitride had a specific surface area (BET) of 24 m²/g and an oxygen content of 1, 1.8% by weight. X-ray phase analysis gave 91% of $\alpha$-$Si_3N_4$ and 9% of $\beta$-$Si_3N_4$. A crystallite size of 54 nm was determined from broadening of the reflection.

EXAMPLE 4 (according to the invention)

75 g of an amorphous silicon nitride prepared according to DE-P 4,037,449.1, having a specific surface area (BET) of 350 m²/g and a chlorine content of 0.84% by weight, were allowed to stand in a graphite crucible in humidified air for 3 hours. This led to an increase in weight of 1.2 g. The powder was then heated in a crucible furnace under a nitrogen atmosphere at a heating rate of 10° C./minute to 1480° C. and heat-treated at this temperature for 1 hour. The completely crystalline silicon nitride removed after cooling had a specific surface area (BET) of 23 m²/g, and X-ray phase analysis gave 94.5% of $\alpha$-$Si_3N_4$ and 5.5% of $\beta$-$Si_3N_4$. A crystallite size of 56 nm was determined from broadening of the reflection.

EXAMPLE 5 (according to the invention)

100 g of an amorphous silicon nitride prepared according to DE-P 4,037,449.1, having a specific surface area (BET) of 350 m²/g and a chlorine content of 0.16% by weight, were allowed to stand in a graphite crucible in humidified air for 6.5 hours. This led to an increase in weight of 1.6 g. The powder was then heated in a crucible furnace under a nitrogen atmosphere at a heating rate of 10° C./minute to 1480° C. and heat-treated at this temperature for 1 hour. The completely crystalline silicon nitride removed after cooling had a specific surface area (BET) of 34 m²/g, and X-ray phase analysis gave 92% of $\alpha$-$Si_3N_4$ and 8% of $\beta$-$Si_3N_4$. A crystallite size of 52 nm was determined from broadening of the reflection.

EXAMPLE 6 (according to the invention)

100 g of an amorphous silicon nitride prepared according to DE-P 4,037,449.1, having a specific surface area of 360 m²/g and a chlorine content of 0.13% by weight, were allowed to stand in a graphite crucible in humidified air for 6.5 hours. This led to an increase in weight of 2.1 g. The powder was then heated in a crucible furnace under a nitrogen atmosphere at a heating rate of 10° C./minute to 1480° C. and heat-treated at this temperature for 1 hour. The completely crystalline silicon nitride removed after cooling had a specific surface area (BET) of 39 m²/g, and X-ray phase analysis gave 91.5% of $\alpha$-$Si_3N_4$ and 8.5% of $\beta$-$Si_3N_4$. A crystallite size of 45 nm was determined from broadening of the reflection.

EXAMPLE 7 (according to the invention)

130 g of an amorphous silicon nitride prepared according to DE-P 4,037,449.1, having a specific surface area of 350 m²/g and a chlorine content of 0.32% by weight, were poured into a rotating rotary evaporation flask, and 20 l/h of moist nitrogen (20 g of $H_2O$/m³) were passed over the pulverulent bed for 3 hours. An increase in weight of 1.2 g was found. The powder was then heated in a graphite crucible in a crucible furnace under a nitrogen atmosphere at a heating rate of 10° C./minute to 1480° C. and heat-treated at this temperature for 1 hour. The completely crystalline silicon nitride removed after cooling had a specific surface area (BET) of 21 m²/g, and X-ray phase analysis gave 92% of $\alpha$-$Si_3N_4$ and 8% of $\beta$-$Si_3N_4$. A crystallite size of 59 nm was determined from broadening of the reflection.

EXAMPLE 8 (according to the invention)

130 g of the amorphous silicon nitride also used in Example 7 were suspended in 1 l of i-propanol containing 1.3% by volume of water, and the suspending agent was then distilled off. The silicon nitride was then heated in a graphite crucible in a crucible furnace under a nitrogen atmosphere at a heating rate of 10° C./minute to 1480° C. and heat-treated at this temperature for 1 hour. The completely crystalline silicon nitride removed after cooling had a specific surface area (BET) of 26 m$^2$/g, and X-ray phase analysis gave 92% of $\alpha$-Si$_3$N$_4$ and 8% of $\beta$-Si$_3$N$_4$. A crystallite size of 55 nm was determined from broadening of the reflection.

We claim:

1. A process for the preparation of silicon nitride having a crystallite size of 40 to 60 nm and a BET specific surface area of 21 to 40 m$^2$/g, which comprises bringing amorphous silicon nitride or amorphous silicon nitridoimide into surface contact with
   a) gas containing water vapor or
   b) water-containing solvents and heating the amorphous silicon nitride or amorphous silicon nitridoimide thus surface-contacted under a nitrogen atmosphere at a heating rate of at least 1° C./minute to above the crystallization temperature of $\alpha$-silicon nitride, which is above 1100° C., for 10-100 minutes.

2. The process as claimed in claim 1, wherein an amorphous silicon nitride obtained by reaction of SiCl$_4$ with NH$_3$, followed by heating in an ammonia atmosphere to about 1000° C., is used.

3. The process as claimed in claim 1, wherein the amorphous silicon nitride used is a partially hydrolyzed silicon nitride obtained by reaction of SiCl$_4$ with moist NH$_3$, followed by heating in an ammonia atmosphere to about 1000° C.

4. The process as claimed in claim 1, wherein the amorphous silicon nitride is contacted with gas containing water vapor for 0.5 to 30 hours.

5. The process as claimed in claim 1, wherein the water-containing solvent used is i-propanol containing 0.5 to 10% by volume of water.

6. The process as claimed in claim 4, wherein the gas containing water vapor used is untreated air.

* * * * *